United States Patent

[11] 3,609,116

[72] Inventors Jack E. Thomas;
Harold P. Owen; Wallace S. Hay; Jack W. McNeilly, all of Fort Worth, Tex.
[21] Appl. No. 781,913
[22] Filed Dec. 6, 1968
[45] Patented Sept. 28, 1971
[73] Assignee General Dynamics Corporation

[54] MOLDABLE SHIM MATERIAL FOR DIMENSIONAL AND AERODYNAMIC SURFACE CONTROL OF AEROSPACE STRUCTURE
3 Claims, 3 Drawing Figs.

[52] U.S. Cl. ........................................................ 260/37 EP,
260/830 TW
[51] Int. Cl. ....................................................... C08g 51/04
[50] Field of Search ............................................ 260/37 EP,
830 TW, 824

[56] References Cited
UNITED STATES PATENTS
3,051,681 8/1962 Partnasky ..................... 260/830 TW X
3,269,974 8/1966 Childs .......................... 260/830 TW X
3,438,937 4/1969 Christie ........................ 260/830 TW X OTHER REFERENCES
Chemical Week, New Cure for Epoxies, 31 July 1969, pages 47 and 48, Sci. Lib., TP1C 383.
Lee et al., Handkook of Epoxy Resins, McGraw-Hill Book Co., 3/67, pages 14-3, 14-4, and 22-2, Sci. Lib., TP 1180.E6 L4.

Primary Examiner—Morris Liebman
Assistant Examiner—L. T. Jacobs
Attorney—Charles C. M. Woodward ABSTRACT: A moldable shim material comprised of specific epoxide resins, buna-N-rubber, filler materials and curing catalysts, which when mixed together in the specified proportions provide superior strength, adhesion and thermal resistance qualities; characteristics which are particularly desirable for structures utilized in aerospace applications.

PATENTED SEP 28 1971
3,609,116
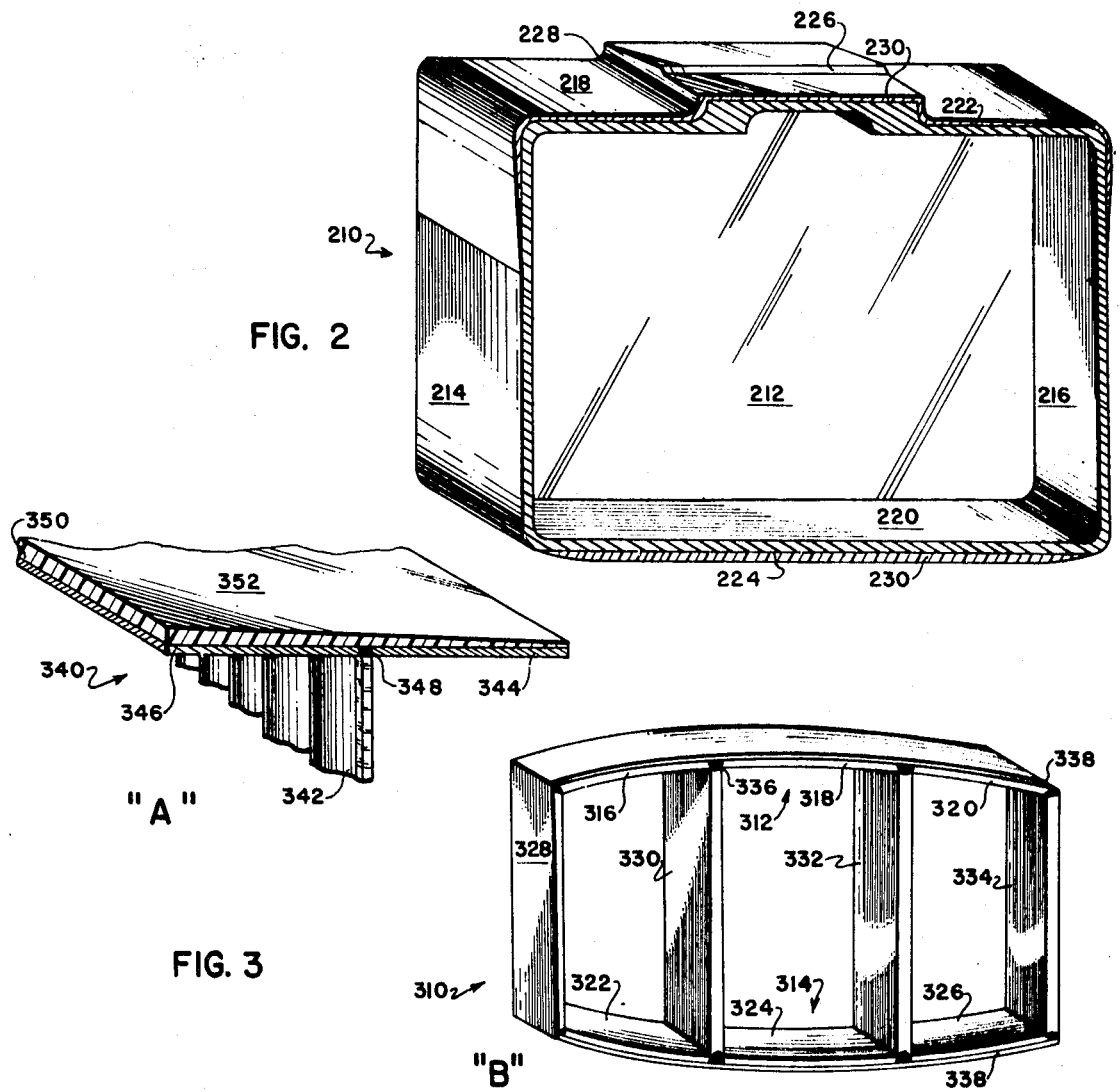
FIG. 2
FIG. 3
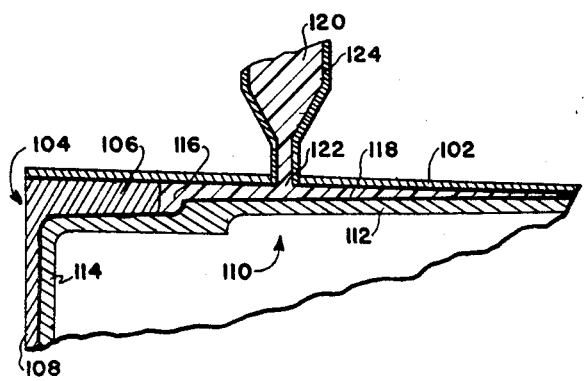
FIG. 1
JACK E. THOMAS
HAROLD P. OWEN
WALLACE S. HAY
JACK W. MCNEILLY
INVENTOR.
BY Charles T. Woodward
ATTORNEY

MOLDABLE SHIM MATERIAL FOR DIMENSIONAL AND AERODYNAMIC SURFACE CONTROL OF AEROSPACE STRUCTURE

The present invention relates generally to moldable shim material composition.

More particularly, this invention relates to compositions for dimensional and aerodynamic surface control of aerospace structure.

The material of the present invention is hardenable within a desirable temperature range and is capable of remaining bonded to metal substrates when applied in long, thick sections, yet possesses, and retains, high strength and thermal stability, has excellent adhesive and impact capabilities and is not subject to any substantial shrinkage during the curing cycle, while retaining a low coefficient of thermal expansion.

PRIOR ART

In the construction of aircraft and aerospace vehicles, aerodynamic requirements have long presented the critical problem of close tolerance contours and mismatch of panel joints on the outer surface of an airframe. Dimensional tolerances for mating these surfaces at the assembly level are affected by the method of manufacture of individual components which are subject to warpage, shrinkage or dimensional tolerance accumulation. Existing solutions to these problems require close tolerance machining of detail components, tolerance adjustment by mechanical means, or addition of metallic shims at assembly.

While similar mismatch problems exist in industries other than the aerospace industry, there are problems peculiar to the aerospace industry that do not exist elsewhere. The wide range of temperatures within the environments in which aircraft must operate and the rapidity of drastic temperature changes experienced dictates the necessity for solutions that would not be required in areas of less stringent usage.

The concept of a moldable shim material is not new, nor is the usage of such materials. However, the present invention resides in the formulation of a moldable shim material which obviates many prior problems and presents a solution to the various compromises which have been necessary in the past. For instance, one of the long existent problems is that present compounds do not possess the physical character and structural capability for sustaining a high degree of imposed load at high temperatures, while having workable consistency during the period of application. Such workability encompasses the requirement of being relatively fluid when being applied, yet the material must be capable of becoming, and remaining, bonded or adhered to the substrate to which it is applied at all times and in all stress and temperature environments to which it may be subjected.

Shrinkage of shim material after application and curing has long been a problem. It is necessary in most instances that a minimum amount of shrinkage be experienced during the curing cycle, yet the shim material must also retain a low coefficient of thermal expansion.

Several disadvantages are inherent in currently available moldable shim material compositions. The materials presently known in the prior art are either brittle—thus having an inherent propensity to shatter under low loading conditions—or they exhibit distortion at relatively low temperature. Another disadvantage resides in the inability of currently available shim materials to remain bonded to metal substrates when applied in long, thick sections. Those with semihigh temperature capabilities spall off substrate metals upon cooling down from curing temperatures due to the extreme differences in coefficients of thermal expansion between the shim composite and the substrate metal. The combination of cure shrinkage and difference in coefficient of thermal expansion between metal and the available shim materials induces tensile stresses which cause cracking of the shim material during the cooling cycle.

Therefore, in view of the above, the primary object of this invention is to provide a cast-in-place moldable shim material applicable particularly at the detail assembly level to parts that are either rough machined or welded to configurations that are undersize in order to "build" them to the desired dimensions, thereby eliminating the necessity for expensive and time consuming machine operations.

Another object of the invention is to obtain a moldable material which, when cured, will retain its original physical properties when subjected to high temperatures of up to about 500° F.

A further object is to provide a moldable shim material which cures at room temperature (75° F.) or at elevated curing temperatures in either horizontal, vertical or overhead positions without excess flow and without any tendency to purl, swell or drip in the latter two conditions.

A still further object of the invention is to provide a moldable shim material which will adhere to aluminum, steel, titanium or other substrates when applied in any thickness up to about 0.20 inch and over large areas and which is capable of maintaining its bond when thermally shocked (such as a change in temperature of from −100° F. to 500° F.), or when mechanically shocked (caused by forces such as heavy-duty rivet guns or rough handling).

A still further object of this invention is to provide a moldable material possessing high compressive strength properties.

A still further object of this invention is to provide a moldable material particularly suited to the aircraft industry capable of serving the aforementioned objects, yet one which is nontoxic and, when cured, is resistant to all lubricants, fuels, paints, salts and solvents.

Other objects and advantages of this invention will become readily apparent from a consideration of the following formulations described herein and in the appended claims and accompanying drawings.

The drawings are illustrative of typical applications of the shim material, wherein:

FIG. 1 is an elevational view taken in cross section showing the capability of the material of the invention to be injected into gaps between mismatched parts;

FIG. 2 is a schematic drawing showing how the molded shim material is capable of being applied to parts with complex contours; and FIG. 3 shows schematically how the molded shim may be applied to provide a finished surface for welded parts.

Referring now to FIG. 1, there is shown a partial, sectional elevational view of a wing and is illustrative of the joining of plural mismatched parts by use of the present invention. As shown, a skin 102 overlies longeron 104 which has a flange 106 and web 108, flange 106 and a web 108 butting against a beam section 110; the beam having a horizontal flange 112 and vertical flange 114. Because of mismatch, voids are created between beam flange 112 and longeron flange 106, as at 116, and between beam flange 112 and the portion of wing skin 102 overlying it as at 118. As indicated, shim material 120, in a fluid state, is injected into the void area through fastener aperture 122 by means of a caulking gun 124. Upon curing, the shim material forms a bond between skin 102 and beam section 110, and between longeron 104 and beam section 110, thus obviating any mismatch problem.

FIG. 2 is an isometric view, partially in section, showing a box-beam structural segment for use in a load bearing aerodynamic structure, illustrating another preferred manner of application of the shim material of the present invention. Beam section 210 comprises a web 212 having vertical or facing flanges 214, 216 and horizontal flanges 218, 220. Flanges 218, 220 both have outside surfaces 222, 224 respectively which require compound contours, while flange 218 may have surfaces 226, 228 for a mating fit with other structural elements. Shim material 230 is here cast in place and applied to the flanges to achieve both the requisite "fit" as well as to form or finish the complex contours of flanges 218, 220. This permits section 210 to be machined undersize at the detail level, or the shim may be applied merely as a layer over rough machined parts, thereby eliminating finish machining and/or hand finishing at the detail level.

FIG. 3 illustrates another application of the invented shim material to load bearing structural elements. FIG. 3A shows a spar comprising a beam 340 having corrugated web 342 and flange 344, 346 tig welded, as at 348 to one edge thereof. Shim material 350 may be applied in any of the above manners, and it tapered, the portion overlaying flange 344 being thinner progressively than that over flange 346, thus providing a finished surface 352 for the welded parts, the flanges 344, 346 being obviously materially more simple to shape than a parent metal flange having the same shape. FIG. 3B is similar to the beam section of FIG. 2, but shows a bulkhead 310 having contoured upper and lower flanges 312, 314 respectively, contoured horizontal plates 316, 318, 320 comprising upper flange member 312 and plates 322, 324 and 326 comprising lower flange 314. These flanges are joined, as by welding, by webs 328, 330, 332 and 334. Obviously, the welded joints, as at 336 for example, may be rough, and to prevent machining, with its inherent finish and property-effecting problems, shim material 338 may readily be cast or molded to the finished contour.

Various formulations are possible and the preference of one formulation over another is dictated by the anticipated use to be made of the shim material. The advantages obtainable by the use of one ingredient in lieu of another are discussed and explained hereafter, as is also the method of mixing the various formulations.

The purpose for which the four selected formulations have been set forth is that the may serve as examples and a guide of the possible variances in formulating the material of the invention to effect desired characteristics.

Usage of the three resins, epoxy novolac resin (DEN-438) produced by Dow Chemical Co. of Midland, Mich. and described in their technical brochure entitled "Dow Epoxy Novolac Resins" form 170-143-4M-1162, epoxy novolac resin (SHELL-152) produced by the Shell Chemical Co., Plastic and Resin Division, and described in their technical bulletin SC-65-34, and diglycidyl ether of bisphenol A resin (DER-332) as produced by Dow Chemical Co. of Midland, Mich. and described in their technical brochure entitled "Introducing Dow Epoxy Resins," form 170-140B, is determined by the characteristics desired. Usage of the various resins represents a "trade-off," i.e., their usage is controlled by the desirability of heat resistance as opposed to workability at room temperature.

DEN-438 imparts high-temperature capabilities, due to its aromatic nature and allows a high degree of cross linking during the curative stages. The disadvantage of DEN-438 is that it is highly viscous at room temperature and therefore difficult to handle.

SHELL-152 imparts advantages which are very similar to those of DEN-438, but at the same time it is slightly less viscous. This advantage of SHELL-152 over DEN-438 is, however, offset by the fact that it is not as thermally stable as DEN-438.

DER-332 is the least viscous of the three resins, although it is the most thermally stable resin of its type. It is a very pure resin. This inherent stability is limited, however, because it is not thermally stable, when used alone, in an environmental temperature above 270° F.

Cyclic epoxy silicone (QZ-8-0903 as manufactured by Dow Corning Corp. of Midland, Mich. and described in U.S. Pat. No. 3,284,398) is an exotic, high-temperature silicone resin having extremely propitious thermal stability. This advantage is offset by the fact that it must be blended with other epoxy resins and is extremely costly. QZ-8-0903 is therefore used only as a modifier in the application herein described.

Butadiene-acrylonitrile copolymer (HYCAR 1001-X225 as produced by the B. F. Goodrich Chemical Co. of Cleveland, Ohio and described in their technical manual HN-4 dated June 1959) is a 65/35 copolymer utilized for its thermal stability and resistance to fuels as compared to other nitrile copolymers. It further serves to reduce brittleness in the shim material, i.e., it lowers the modules of elasticity of the shim. These advantages are offset by the fact that it is difficult to mix into the compound, requiring a process of liquidation and subsequent evaporation.

Silica S Micron, an amorphous silica (99.5 percent pure, of 5.5 micron average particle size as produced by Tamm'Industries, Lyons, Ill. and described in their technical data sheets) is used as the basic filler in the present formulation because it possesses an affinity for the curing agent ingredient, ethyl methyl imidazole (EMI-24), a nucleophile-type catalyst, as produced by the Houdry Process and Chemical Co., a division of Air Products and Chemicals, Inc. of Allentown, Pa. and described in their technical bulletin entitled "EMI-24, Curing Agent for Epoxy Resin Systems," 1965 and imparts an additional thermal stability because of the combination.

Long-staple asbestos 7TF (manufactured by Ruberoid Corp. New York, N.Y. and described as asbestos floats) is used in formulations 1 and 2 to impart a quality of thixotropy and is not necessary to formulations 3 an 4 because they (3 and 4 ) are inherently more viscous due to their resin combination.

Powdered aluminum (325-mesh powdered aluminum available from many aluminum companies among which are Reynolds Aluminum Co., Aluminum Co. of America and Kaiser Aluminum Co.) is utilized as an ingredient primarily to impart an aluminum color to the shim and secondarily because it imparts added thermal resistance.

The other asbestos specified (CRL-81-31) is a chrysolite type of asbestos produced by the Asbestos Corp. of America and described in their technical information sheet TI-104, dated Aug. 1963 and is a finer grade of asbestos than 7TF. This asbestos (CRL-81-31) is utilized to impart thixotropy and reinforcement plus serving to impart additional thermal stability.

Chopped glass fibers (type 701 as produced by the Owens Corning Fiberglass Corp. of Toledo, Ohio are ¼-inch-long chopped Pyrex glass fibers which are utilized as an ingredient because they serve to reinforce the compound while at the same time reducing its brittleness.

Triethylene tetramine (TETA) which is commercially available from many sources, provided it is of a technically pure grade, is used for the purpose of adjusting the cure temperature of the compound. Of the room-temperature curing agents utilized, TETA imparts the best high-temperature properties to the formulation.

Ethyl methyl imidazole (EMI-24) is a special curing agent catalyst which is a nonstaining, nontoxic, high-temperature curing agent for epoxies and is particularly well suited to epoxy formulations containing a silica filler.

Formulas 1 and 2 were prepared as follows:

All resins and fillers were dried 2 hours at 250° F. to 270° F. in a circulating forced-air oven. All fillers were manually mixed into the resins while all ingredients were still hot from the oven drying. The hand-mixed batch was then thoroughly mixed on a 3-roll ink mill. The mix can be heat-cured (350° F.) with only the EMI-24 catalyst. For room-temperature cure plus heat cure (200°–350° F.), both the EMI-24 and TETA catalysts were hand mixed into the formulation. Rate of room-temperature cure can be adjusted by varying the quantity of TETA from 0 to 12 parts by weight.

In formulations 3 and 4, rubber was added to increase flexibility and shock resistance of the cured materials. Tests of amounts ranging from 1 to 8 percent by weight of resins showed that 5 percent by weight of rubber was optimum. The rubber, a 65/35 acrylonitrile butadiene copolymer (HYCAR 1001 X 225) is milled for 10 minutes then dissolved in methyl ethyl ketone (MEK). The resultant solution is 15 percent rubber, 85 percent MEK by weight. Prior to the mixing step for formulations 3 and 4, DER-332 resin and the rubber solution obtained above were mixed in proportions to give a 90/10 ratio of resin to rubber, dry-weight basis. The solvent (MEK methyl ethyl ketone) was removed from the rubber resin mixture by vacuum distillation. The mixture was heated to a temperature of 180° F. to 220° F. to lower the viscosity and to accelerate the removal rate of the MEK. All ingredients of formulations 3 and 4 were dried 2 hours at 270° F. While still hot, the resins and all fillers, except the chopped glass, were hand mixed then thoroughly mixed on a 3-roll ink mill with rolls closed tight (5-10 mils). Following this mixing step, resulting in a thorough mixing of all the above ingredients, the mill rolls were opened to settings of 25 to 30 mils and the chopped glass was added to the mix. Opening the rolls prevents the chopped glass fibers from being broken too finely in the mixing process, thus preventing the destruction of the reinforcement furnished by the ¼-inch-long glass fibers.

All formulations are stored uncatalyzed at room conditions. Just prior to application, EMI-24 and TETA catalysts are added. If the formulations are to be injected into molds and cured at elevated temperatures, only the EMI-24 catalyst need be used. If a room-cure formulation is desired, 0 to 12 parts of TETA are added to the formulations in addition to the 2 parts of EMI-24.

More specifically, the following formulations are typical of material combinations found to meet the objectives of the present invention.

The formulations set forth in the following table represent typical mixtures used to balance the advantages and disadvantages obtained by usage of the individual components. It is not to be construed that usage exactly as set forth indicates that these are the sole proportions in which the shim material may be mixed. Those set forth serve as examples on which exhaustive studies have been made. These specific formulations are preferred and are indicated as such as opposed to the general classification.

Testing has proven that there are ranges or variations allowable in the parts-by-weight ratios of the various ingredients shown in the above table. The acceptable spread or variation thereof is set forth in the following table and is therein indicated as being the "general" parts by weight.

[Parts by weight]

| Ingredients (commercial designation) | Example formulations | | | |
|---|---|---|---|---|
| | 1 | 2 | 3 | 4 |
| Epoxy novolac resin (DEN-438): | | | | |
| General | 35-65 | 35-65 | 35-65 | |
| Specific | 50 | 50 | 50 | |
| Epoxy novolac resin (Shell-152): | | | | |
| General | | | | 35-65 |
| Specific | | | | 50 |
| Digylcidyl ether of bisphenol A resin (DER-332): | | | | |
| General | 35-65 | 10-40 | 35-65 | 35-65 |
| Specific | 50 | 25 | 50 | 50 |
| Cyclic epoxy silicone (QZ-8-0003): | | | | |
| General | | 10-50 | | |
| Specific | | 25 | | |
| Butadiene-acrylonitrile copolymer (HYCAR 1001X225): | | | | |
| General | | | 2-8 | 2-8 |
| Specific | | | 5 | 5 |
| Silica (S-micron): | | | | |
| General | 80-120 | 80-120 | 40-100 | 40-100 |
| Specific | 100 | 100 | 70 | 70 |
| Asbestos (7TF): | | | | |
| General | 0-15 | 0-15 | | |
| Specific | 10 | 10 | | |
| Powered aluminum (1-131): | | | | |
| General | 10-30 | 10-30 | 10-30 | 10-30 |
| Specific | 20 | 20 | 20 | 20 |
| Asbestos (81-31): | | | | |
| General | 0-20 | 0-20 | 0-20 | 0-20 |
| Specific | 10 | 10 | 10 | 10 |
| Chopped glass fibers (Type 701 ¼"): | | | | |
| General | | | 5-35 | 5-35 |
| Specific | | | 20 | 20 |
| Ethyl methyl imidazole (EMI-24): | | | | |
| General | 1.5-3 | 1.5-3 | 1.5-3 | 1.5-3 |
| Specific | 2 | 2 | 2 | 2 |
| Triethylene tetramine (TETA): | | | | |
| General | 0-12 | 0-12 | 0-12 | 0-12 |
| Specific | 3 | 3 | 3 | 3 |
| Total parts by weight | 245 | 245 | 230 | 230 |

Formulations incorporating HYCAR 1001 X 225 require a solvent additive, mixing with DER-332 resin, then subsequent evaporation of the solvent to achieve the correct formulation of the incorporated ingredients.

It has been determined that combinations of epoxy novolac and diglycidyl ether of bisphenol-A resins, with finely ground silica and other fillers for flow control and catalyzed with ethyl methyl imidazole (EMI) or a combination of EMI and triethylene tetramine (TETA) will produce molded shim material with all the highly desirable physical properties taught by the present invention.

The following table represents the approximate maximum and minimum weight allowance for the basic generic groups of ingredients which are the resins, fillers, curing agent, catalyst and in the case of two of the preferred formulations, buna-N-rubber:

| Ingredients | Parts by Weight | |
|---|---|---|
| | Min. | Max. |
| Resins | 55 | 145 |
| Buna-N-Rubber | 0 | 8 |
| Fillers | 55 | 185 |
| Curing Catalysts | 1.5 | 15 |
| | 111.5 | 353 |
| | Average | 232 |

The above table is predicated upon the inclusion of approximately 100 parts by weight of resin material. It is obvious that only one resin may be used in lieu of two or three as indicated above, and if less than 100 parts by weight is used, the amount of catalyst may be reduced proportionately.

The advantages obtained by the usage of each of the four example formulations set forth above as compared to the others shown may be summarized as follows:

Example formulation No. 1 is a general-purpose moldable shim material applicable with either an injection gun or spatula and which, when properly cured, has exceptionally high compressive strength as well as good adhesion to aluminum, steel and titanium. Curing catalysts used with this formulation can be adjusted to provide for a room-temperature cure or an elevated temperature cure. This formulation when cured at 200° F. or above has excellent property retention at elevated temperature, but it is of a higher modulus than the others and therefore more brittle than is desirable for some large-area molded shim applications.

Formulation No. 2 is substantially the same as No. 1 except that 50 percent of the DER-332 is replaced with a low-viscosity cyclic epoxy silicone resin, QZ-8--0903. The lower viscosity of resin reduces the viscosity of the mixed formulation which makes it easier to apply at room temperatures. This substitution does not adversely affect its properties at elevated temperatures and in some instances, such as lap shear at 250° F., it offers improvement.

The third formulation given above is similar to example formulation No. 1 except that a high-temperature, solvent-resistant rubber, Buna-n is added to the formulation which improves its adhesion to substrates and reduces its modulus of elasticity, therefore reducing its brittleness. Chopped glass fibers were also added to this formulations, which improves its toughness, while silica and asbestos content were reduced to accommodate the rubber and chopped glass fiber additions.

The improved adhesion and reduced modulus (brittleness) are achieved by sacrificing some of the formulations' elevated-temperature properties and processability at room temperature, but the improvement thus achieved more than off sets the disadvantages accrued by this change in formulation.

Formula 4 differs from formulation No. 3 only in that the highly viscous DEN-438 resin is replaced by a less viscous resin, Shell-152. This direct substitution produces a less viscous, more workable formulation at room conditions (75°–80° F.), but some desirable elevated temperature properties are reduced. Better wetting of substrates is achieved with formulation No. 4 as compared with No. 3, therefore, this formulation provides better adhesion capability.

The present invention answers the problems existing in industry and particularly the aircraft industry to date by providing a moldable shim material which is characterized by high strength, thermal resistance, retention of properties up to 500° F., good adhesion to aluminum, steel or titanium in lap joints and when applied over large areas up to 0.125 inch thick. Moreover, the formulas can be cured at room temperature (75° F.) or at elevated temperatures. Cured formulations are resistant to shock loads such as are inherently incurred in manufacture by rivet guns and other means of fastener installation.

In the uncured state, the shim material is similar to caulking compound and is capable of being injected into any structural gaps which should be filled, or it may be applied prior to the mating of the parts. The shim material may also be pressed or calendered into strips and applied in strip form prior to mating of the parts.

The material of the present invention, when fully cured in place has the approximate hardness of annealed 2024 aluminum and may be considered a structural member. Further, it is resistant to cold and heat from −65° F. to +500° F. and may be machined, drilled or riveted. It is resistant to all known lubricants, fuels, paints, salts and solvents and provides excellent adhesion to aluminum, titanium, steel and boron composites.

A few sample applications of this invention are listed as follows: (1) Shimming gaps and offsets in structures on the assembly line, (2) use as a cast-in-place shim material at the detail level for forming complex contours on parts machined undersize, (3) as a layer, over rough machined parts, eliminating finish machining and/or hand finishing at the detail level, (4) as a close-tolerance molding to produce accurate and identical parts at the detail level, (5) for repair of parts where structurally allowable and (6) for economical correction of out-of-tolerance tooling.

In summary, the present invention provides a plastic composite material, its salient use being as a cast-in-place moldable shim material applicable at the detail assembly level to parts that are either rough machined or welded to a configuration that is undersize relative to the desired dimensions. The method provided by the invention eliminates the need for expensive multiaxis, swarf or contour machine operations previously necessary in machining a part to the close tolerances required for aerodynamic smoothness. Machine spindle time for the conventional aluminum airframe is currently a very critical factor and will become more serious as more steel or titanium components are introduced into future air frames. The present invention thus provides a ready, economical solution to the ever-increasing tool machining requirements.

In the case of weldments such as bulkheads, the design engineer may now depend on accurate thicknesses through the use of as-welded sheet-material parts. The usual criticality of maximum and minimum tolerances that previously faced final machining operations—to compensate for warpage and shrinkage—is obviated by the invention. In many cases the weight penalty imposed by specifying these close tolerances and their potential accumulation is more than that attributable to the material of the present invention which would be used to replace it.

We claim:

1. A moldable material consisting of, in parts by weight, in combination:
   A. at least two epoxide resins, one of which is bisphenol A resin, and the second of which is either epoxy novolac resin or cyclic epoxy silicone;
      1. the range of said epoxy novolac resin is from about 35 to 65 parts by weight; and
      2. said bisphenol A resin is a diglycidyl ether of bisphenol A resin in a range from about 10 to about 65 parts by weight; and
      3. the range of said cyclic epoxy silicone is from about 10 to about 40 parts by weight;
   B. an imidazole catalyst, said catalyst having a range of from about 1.5 to about 3 parts by weight;
   C. one or more fillers from the group consisting of silica, asbestos, aluminum and glass fibers in parts by weight from 55;
      1. at least one of said fillers being silica in parts by weight from about 40 to about 120; and
   D. a modifier of a solvent soluble buna-nitrile rubber in parts by weight up to about 8.

2. The composition as defined in claim 1 wherein the said solvent-soluble buna-nitrile-type rubber is a butadiene-acrylonitrile copolymer.

3. The composition as defined in claim 3 with the addition of triethylene tetramine as a curing agent in parts by weight up to about 12.